MANUFACTURE OF EXTRUDED SECTIONS BY USING NONROUND BILLETS

Filed Oct. 24, 1960

8 Sheets-Sheet 1

INVENTORS
HUBERT J. ALTWICKER
KARL F. BRAEUNINGER
BY Wade Koontz
ATTORNEY
and
Arthur R. Parker
AGENT INVENTORS
HUBERT J. ALTWICKER
KARL F. BRAEUNINGER
BY Wade Koontz
ATTORNEY
and Arthur R. Parker
AGENT Oct. 23, 1962 H. J. ALTWICKER ET AL 3,059,768
MANUFACTURE OF EXTRUDED SECTIONS BY USING NONROUND BILLETS
Filed Oct. 24, 1960 8 Sheets-Sheet 3

INVENTORS
HUBERT J. ALTWICKER
KARL F. BRAEUNINGER
BY Wade Koontz and
ATTORNEY
Arthur R. Parker
AGENT

MANUFACTURE OF EXTRUDED SECTIONS BY USING NONROUND BILLETS

Filed Oct. 24, 1960 8 Sheets-Sheet 4

*INVENTORS*
HUBERT J. ALTWICKER
KARL F. BRAEUNINGER
BY Wade Koontz
ATTORNEY
and
Arthur R. Parker
AGENT

MANUFACTURE OF EXTRUDED SECTIONS BY USING NONROUND BILLETS

Filed Oct. 24, 1960 8 Sheets-Sheet 5

INVENTORS
HUBERT J. ALTWICKER
KARL F. BRAEUNINGER
BY Wade Koontz
ATTORNEY
and
Arthur R. Parker
AGENT Oct. 23, 1962 H. J. ALTWICKER ET AL 3,059,768

MANUFACTURE OF EXTRUDED SECTIONS BY USING NONROUND BILLETS

Filed Oct. 24, 1960 8 Sheets-Sheet 6

*INVENTORS*
HUBERT J. ALTWICKER
*BY* KARL F. BRAEUNINGER
Wade Koontz
ATTORNEY and
Arthur R. Parker
AGENT

MANUFACTURE OF EXTRUDED SECTIONS BY USING NONROUND BILLETS

Filed Oct. 24, 1960 8 Sheets-Sheet 7

INVENTORS
HUBERT J. ALTWICKER
KARL F. BRAEUNINGER
BY Wade Koontz
ATTORNEY
and
Arthur R. Parker
AGENT

MANUFACTURE OF EXTRUDED SECTIONS BY USING NONROUND BILLETS

Filed Oct. 24, 1960

8 Sheets-Sheet 8

*INVENTORS*
HUBERT J. ALTWICKER
KARL F. BRAEUNINGER
*BY* Wade Koontz [signature]
ATTORNEY
Arthur R. Parker [signature]
AGENT United States Patent Office 3,059,768

Patented Oct. 23, 1962

3,059,768

MANUFACTURE OF EXTRUDED SECTIONS BY USING NONROUND BILLETS

Hubert J. Altwicker, Dayton, Ohio (R.R. 2, Lebanon, Ohio), and Karl F. Braeuninger, 535 Plantmore Drive, Ferguson, Mo.

Filed Oct. 24, 1960, Ser. No. 64,685
2 Claims. (Cl. 207—2)
(Granted under Title 35, U.S. Code (1952), sec. 266)

The invention described herein may be manufactured and used by or for the United States Government for governmental purposes without payment to us of any royalty thereon.

This application is a continuation in part of our copending patent application Serial No. 610,034 filed September 14, 1956, now abandoned, which in turn was a continuation-in-part of the then copending application Serial Number 220,698, filed April 12, 1951, now abandoned. This invention relates to extrusion processes and, more particularly, to the cross-sectional contour of the billet container and billet relative to the profile of the extruded member.

The dimensions of extrusion profiles are limited by the size of the billet container of the extrusion press. It has been the prior practice to employ cylindrical billet containers of circular cross section for extrusion presses. The maximum width of the extruded section is less than or equal to the inside diameter of the container so that an increased container diameter must be employed for any increase in the width of the extruded section. The round container produces under certain conditions extruded sections having several defects. One of these is that deep lacerations can occur in the extruded section due to the stretching of the slower flowing outer portion of the billet to maintain flow of the faster flowing center portion; this is due to the fact that the pressure decreases substantially from the inside to the outside of the billet primarily due to friction between the billet and the wall of the container. Another defect observed in extruding alloys of high deformability into wide sections at elevated temperatures from round containers are waves in the center of the extruded section. Thus, it will be readily observed that round containers utilizing round billets have several distinct disadvantages including the fact that the diameter of the billiet must be increased each time that it is desired to increase the width of the extruded section.

One method of forming an extruded section of greater width than the inside diameter of the container is to form lateral pockets at the front end of the container adjacent the die. These pockets lead into appropriate antichambers in the die itself whereby the metal flow is distributed over greater width before entering the final die contour. Eighteen inch wide flat strips have been extruded from a twelve-inch container by using this arrangement. One of the disadvantages of this arrangement is that the metal in the die antichambers remains, especially when using soft, adherent alloys, and cannot always be removed whereby overlaps and blisters occur during the following extrusion. The considerably enlarged frictional area in the die requires very high pressure, which is completely out of proportion to the extrusion ratio. Another disadvantage of this method is that early breaks frequently occur in the container wall starting at the side pockets.

Another method of producing a section considerably wider than the diameter of the round billet container is to extrude hollow sections in the form of round or polygonal tubes by means of a round or polygonal mandrel. These tubes are then cut lengthwise and the extruded tubes are then flattened to provide a flat sheet equal in thickness to the wall of the tube and as wide as the circumference of the tube. However, a special apparatus is required to level the extruded section after splitting the tube; this, of course, adds to the cost of the finished product. However, this method does produce a section that is considerably wider than the diameter of the round billet container, which was employed to extrude the tube or hollow section.

A still further method for making a section wider than the diameter of the round container is to employ a die with an opening of U or W shape. After extruding the U or W profile, the U or W is flattened to provide a width equal to the sum of the legs of the U or W substantially as shown in Patent Number 2,681,734 issued to Karl Braeuninger, one of the applicants in the present application, on June 22, 1954. This has the disadvantage of placing a more severe requirement on the stability of the die. Efforts to evade the limits set by the diameter of containers of circular shape in the aforementioned methods can only be considered auxiliary measures that do not fully meet present requirements.

Prior to the present invention, it has been the practice to increase the diameter of the round billet containers of extrusion presses whenever demands for thinner and wider extruded profiles were required. However, the present demand of aircraft and construction companies, for example, for a profile greatly extended in width eliminates the practice of increasing the diameter of the round billet containers. This is due to the fact that the larger billet containers are not able to deliver the high specific pressure required for the production of extrusions made of high strength alloys because the increase in container size reduces the magnitude of the specific pressure available on existing presses.

For example, if it were desired to extrude a section forty inches wide by using the usual round container, the bore would have to be at least forty inches in diameter and, thus, have a cross section of 1,257 square inches. A sufficiently high specific pressure must be applied to extrude a member. With a specific pressure of 31 tons per square inch required, a total pressure of approximately 38,000 tons must be applied against a round billet of 40 inches diameter to extrude the profile having a width of forty inches. If a nonround billet such as a flat billet forty inches by eight inches, is employed to produce an extruded section having a width of forty inches, the same specific pressure of 31 tons per square inch is required, but the press needs a total pressure of approximately 10,000 tons since the area of the billet is only 320 square inches whereas the round billet of forty-inch diameter had an area of 1,257 inches. Thus, it will be readily observed that a press using a nonround container requires a pressure capacity of only thirty percent of the pressure required for a press using a round container to produce an extruded sheet of the same width. In addition to the reduced pressure capacity of the press, it also will be appreciated that the wide profile, which is extruded, is generally of a small wall thickness and requires only a relatively small volume of metal. Thus, the volume of the round billet is much greater than that required to produce the extruded member.

An object of this invention is to provide apparatus for extruding profiles of substantially large width relative to their thickness from nonround containers of substantially the same width.

Other objects of this invention will be readily perceived from the following description.

This invention relates to extruding means for extruding a thin, wide metallic sheet from a nonround billet in combination with a high pressure press. The extruding means includes a container having a nonround passage to freely receive the billet to be extruded, a ram movable in the passage of the container, and an extruding die member having an opening therein with the opening being shaped to extrude the desired profile.

The attached drawings illustrate preferred embodiments of the invention, in which FIG. 1 is a diagrammatic view illustrating the pressure distribution over the width of the extrusion die for a round billet container;

FIG. 9 is a vertical axial sectional view of the apparatus of FIG. 3 after the ejector has operated to move the remainder of the billet;

Figure 1:
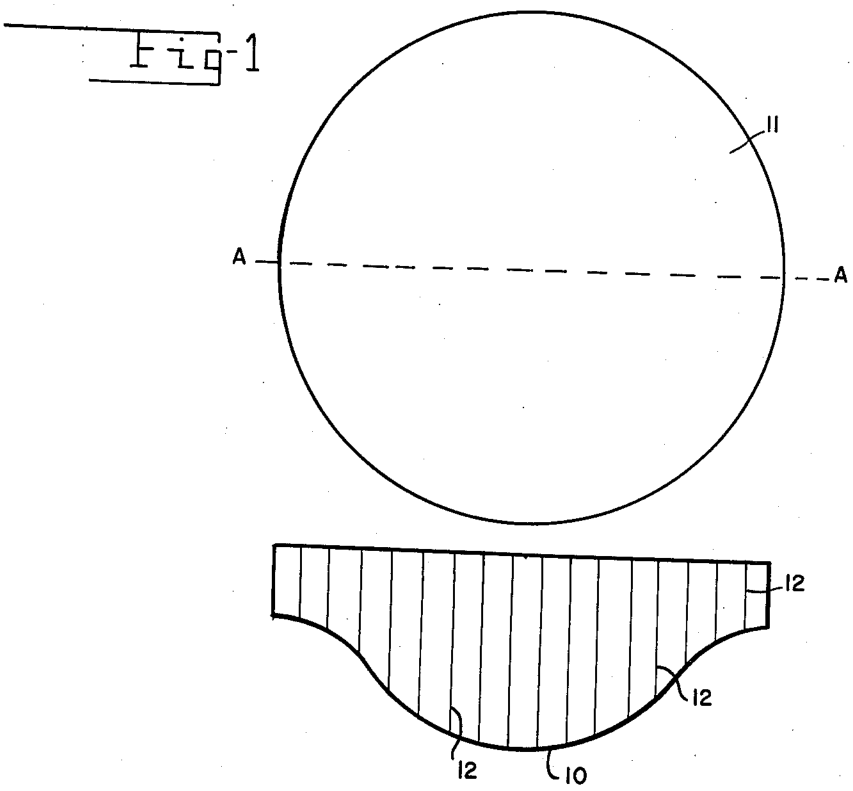

Referring to the drawings and particularly FIG. 1, there is shown the distribution of pressure on a round billet 11 across its diameter, as shown by line A—A, when extruding from a round container as obtained from actual tests. These tests consisted of applying a specific pressure across the entire area of the round billet 11 disposed in a round container and measuring the flow of the metal through a test die having cylindrical bores of equal diameters and lengths. The magnitude of the pressure distribution, across the billet along line A—A at the die end of the container, is indicated by a convex curve 10 wherein the length of the ordinates 12 indicate the amount of metal flow in the test die at that point along the diameter of the billet. As is readily seen from the curve 10, there is a substantial pressure decrease from the inside to the outside of the billet; it will be understood that the variation in pressure between the inside and outside depends on the type of alloys being pressed and their deformability at elevated temperatures.

Figure 2:
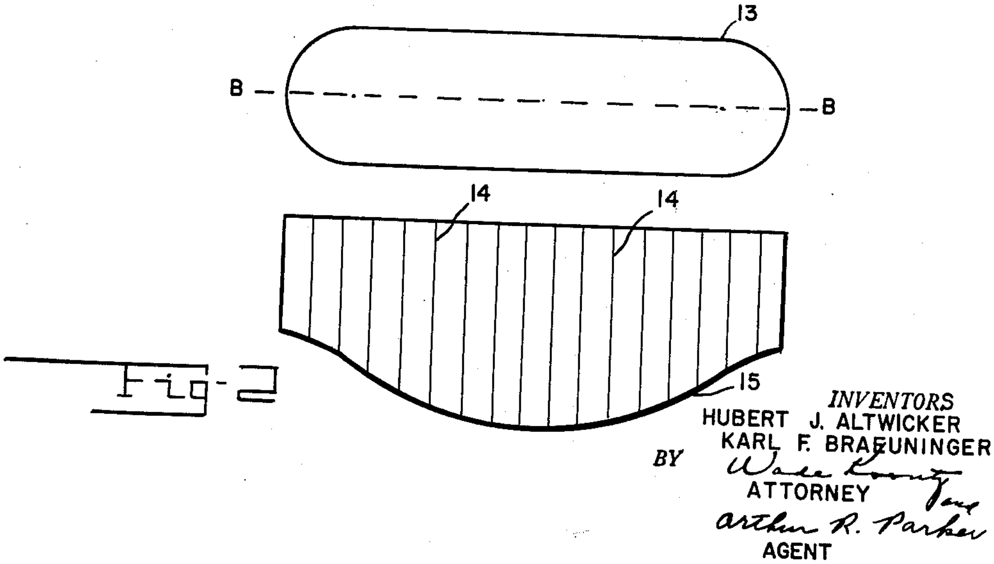
FIG. 2 is a diagrammatic view illustrating the pressure distribution over the width of the extrusion die for a nonround billet container.

As shown in FIG. 2, the extrusion of a nonround billet 13 results in a pressure distribution at the die end of the container across its width, as shown by line B—B, of curve 15, which was obtained from actual tests using the previously mentioned test die with a nonround container. The curve 15 shows that its ordinates 14 are substantially the same length throughout the width of the billet 13 so that there is a substantially equal distribution of pressure across the width of the nonround billet 13. The value of the ordinates 12 and 14 of the curves 10 and 15, respectively, depends on the type of alloys but the curves 10 and 15 have substantially the same ratio, as shown in FIGS. 1 and 2, for any specific alloy.

The installation of nonround containers of a very large size on existing extrusion presses is prohibited by space conditions. This is due to the fact that the location of the columns of the press prevents the walls of the container from having sufficient thickness to withstand the high pressure required. However, this limitation is being overcome and future extrusion presses will have larger column-distances and sufficient capacity to extrude very wide sections from nonround containers.

Figure 3:
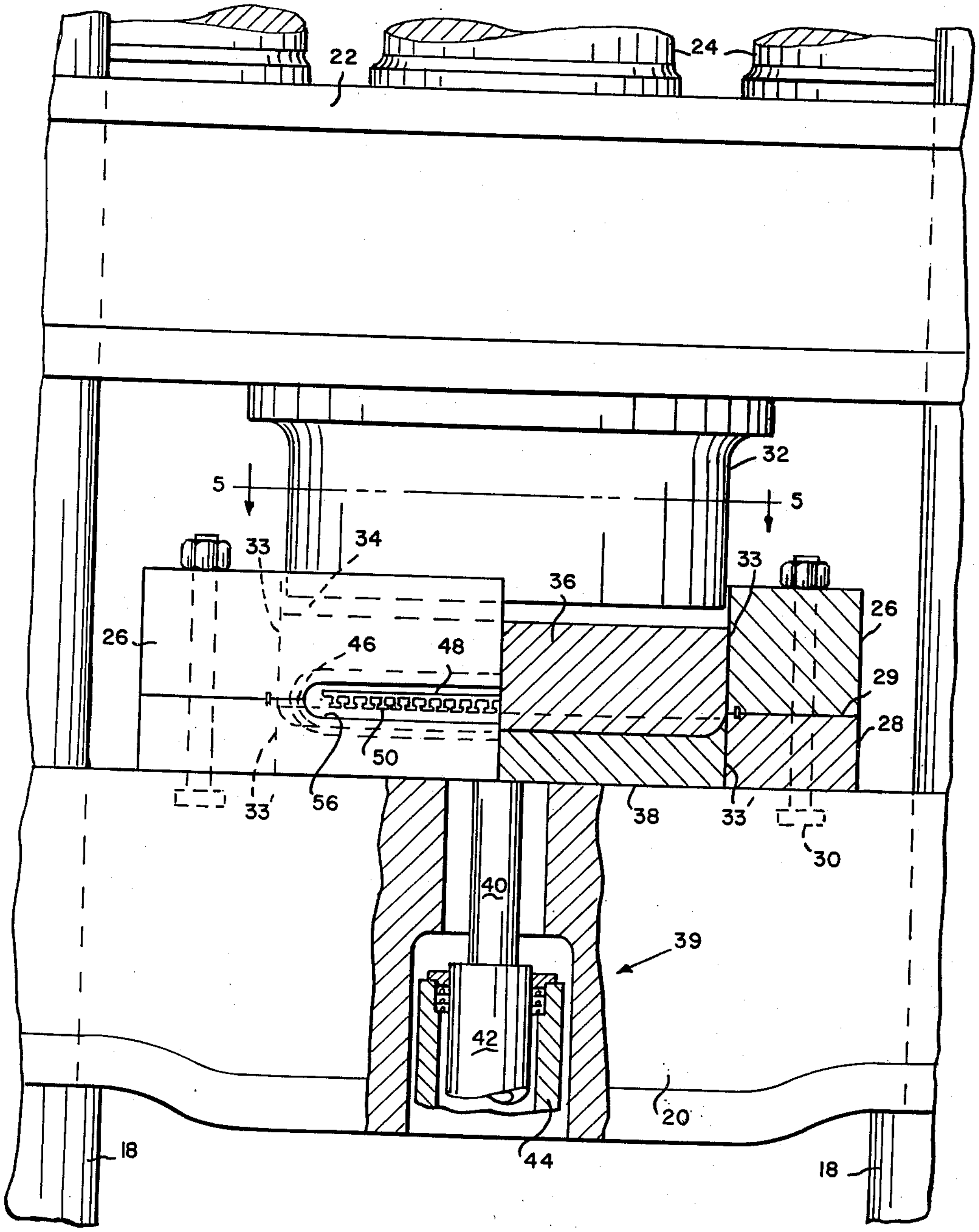
FIG. 3 is a front elevational view, partly in vertical axial cross section, of a heavy duty vertical forging press equipped with dies and a container arranged for extruding wide metal sheets laterally.
Figure 4:
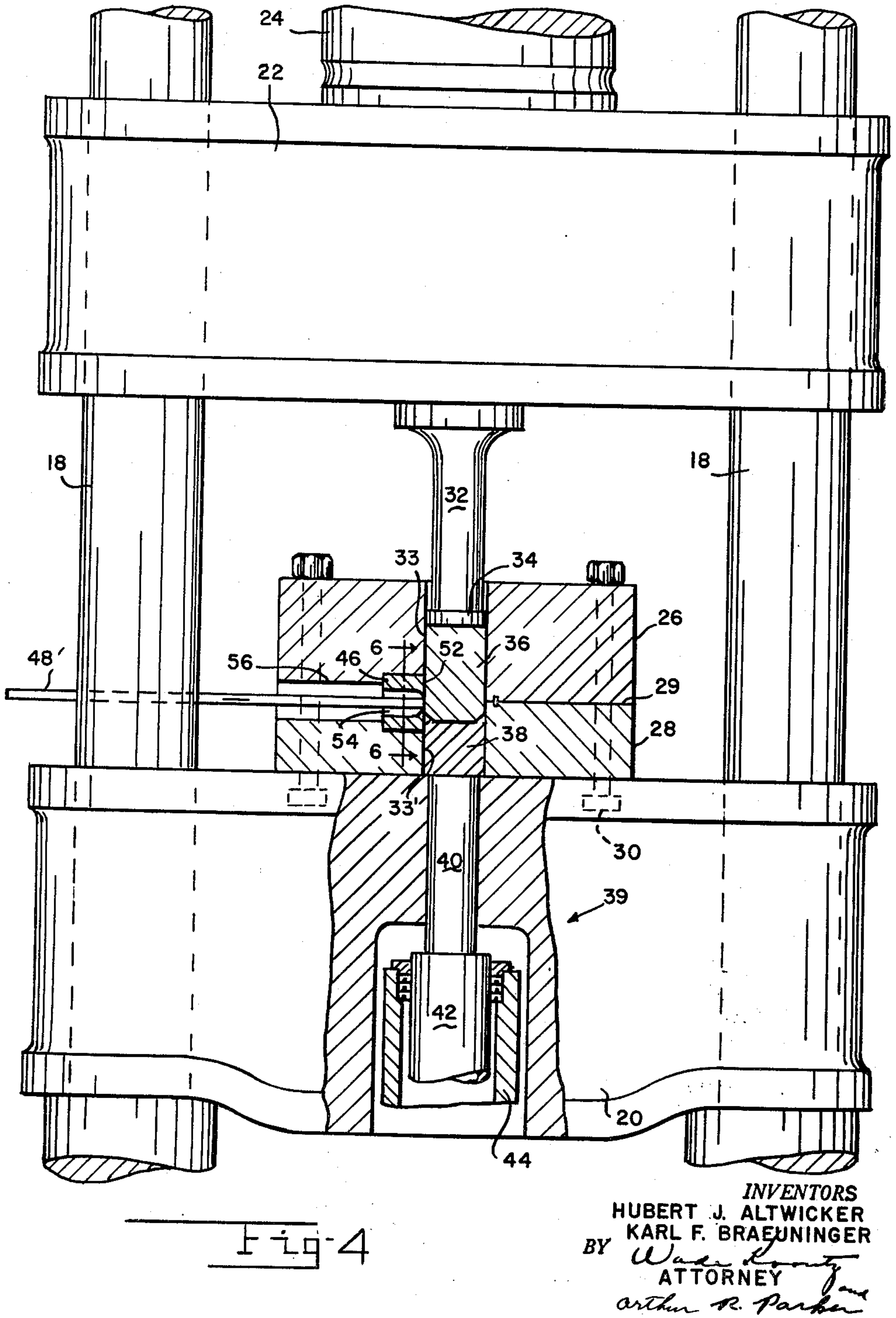
FIG. 4 is an end elevational view, partly in vertical axial section, of the apparatus of FIG. 3.

One other method of extruding wide profiles from nonround containers is to employ a vertical forging press in which the extrusion takes place perpendicular to the pressure direction of the ram. A heavy duty vertical forging press for extruding wide sections from nonround containers is shown in FIGS. 3 and 4. This press comprises a series of columns 18 upon which a lower cross head 20 is supported and an upper or piston cross head 22 is slidable. Press pistons 24 supply the pressure for moving the upper or piston cross head 22 downward.

Figure 5:
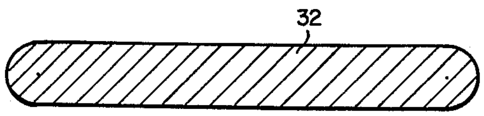
FIG. 5 is a horizontal sectional view taken along the line 5—5 of FIG. 3.

A rectangular container comprising an upper part 26 and a lower part 28 with a gasket 29 therebetween is secured to the lower cross head 20 by bolts 30. A ram 32 is secured to the underside of the upper or piston cross head by appropriate means (not shown). As will be observed from FIG. 5, the ram 32 has a nonround cross section and, as shown, is an elongated substantially rectangular cross section. The upper container part 26 has a billet passage 33 extending therethrough of the same cross-sectional contour as the ram 32 but made slightly larger to provide proper clearance. A dummy block 34 is secured to the underside of the ram 32 and fits closer to the walls of the container passage 33 than the ram 32. As is observed from FIG. 3, the dummy block 34 abuts against the top of a billet 36 disposed within the passage 33 of the container part 26. The lower part 28 of the billet container has a passage 33′ therethrough corresponding to the passage 33 in the upper part 26. Thus, the passages 33 and 33′ of the container cooperate to form a passage of substantially the same width as the width of the billet.

An ejector bar 38, which is movable upward by an ejector ram 40, is disposed within the passage 33′. An ejector piston 42 is operative in an ejector cylinder 44 to raise the ram upward. The cylinder 44, the piston 42, and the ram 40 are disposed within a chamber in the lower cross head 20 of the press. The ejector parts 38, 40, 42 and 44 may be collectively referred to by the numeral 39.

Figure 6:
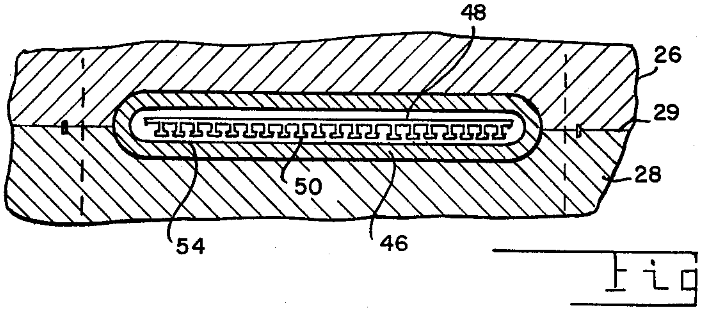
FIG. 6 is a sectional view taken along the line 6—6 of FIG. 4.

A die 46, shown in detail in FIG. 6, is arranged for lateral extrusions. It is designed for extruding thin, wide sheets with a plurality of small integral T shaped ribs closely spaced and running lengthwise of the sheets, but it will be understood that the die could have any other shape, if desired. The die 46 has an elongated slot 48 and integral T slots 50 extending from the elongated slot 48 at right angles thereto to extrude the wide, thin sheets therethrough. The die 46 has a cutting face 52 (see FIG. 4), which is next to the billet 36 in the passage 33. The die 46 is disposed within a recess formed between the upper part 26 and the lower part 28 of the container with half of the die disposed in the recess in the upper part 26 and half in the lower part 28. The die 46 has a cutaway portion 54 to clear the extrusion and the container has a similar cutaway portion 56 to clear the extrusion.

Considering the operation of the vertical forging press, the position of the parts at the completion of an operation is shown in FIG. 9 with the billet 36 having a remainder 37 lying on top of the ejector bar 38 and with the ram 32 raised to a height above the upper part 26 of the container somewhat greater than the length of a whole billet.

Figure 7:
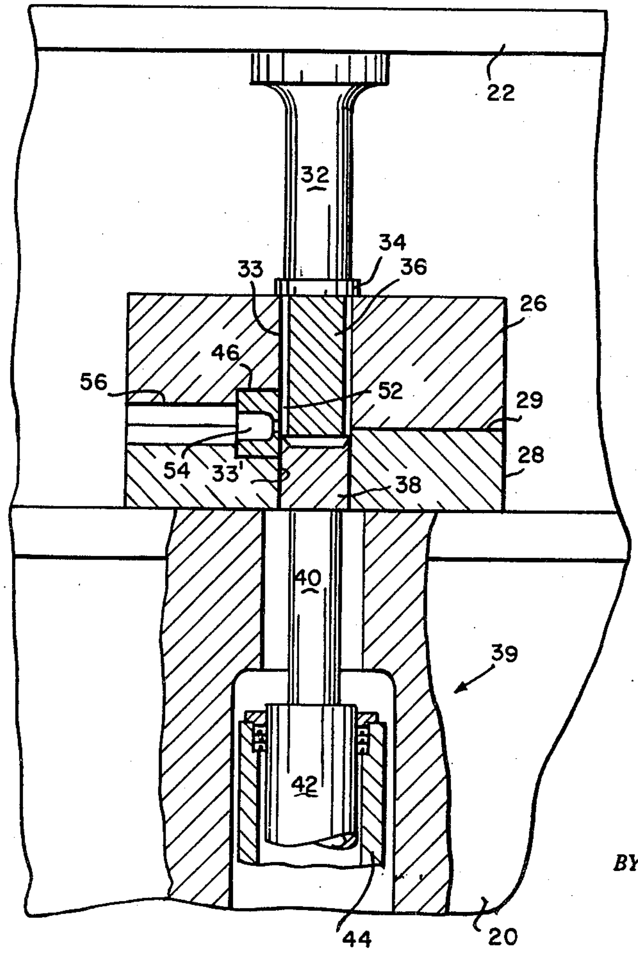
FIG. 7 is a vertical axial sectional view of a portion of the apparatus of FIG. 3 at the beginning of the operating stroke.
Figure 7:
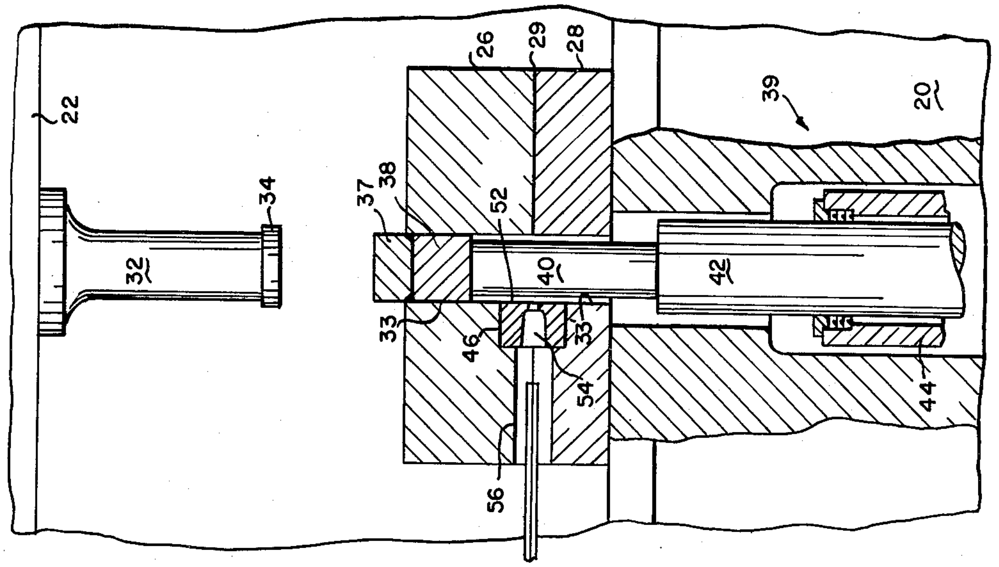
Figure 8:
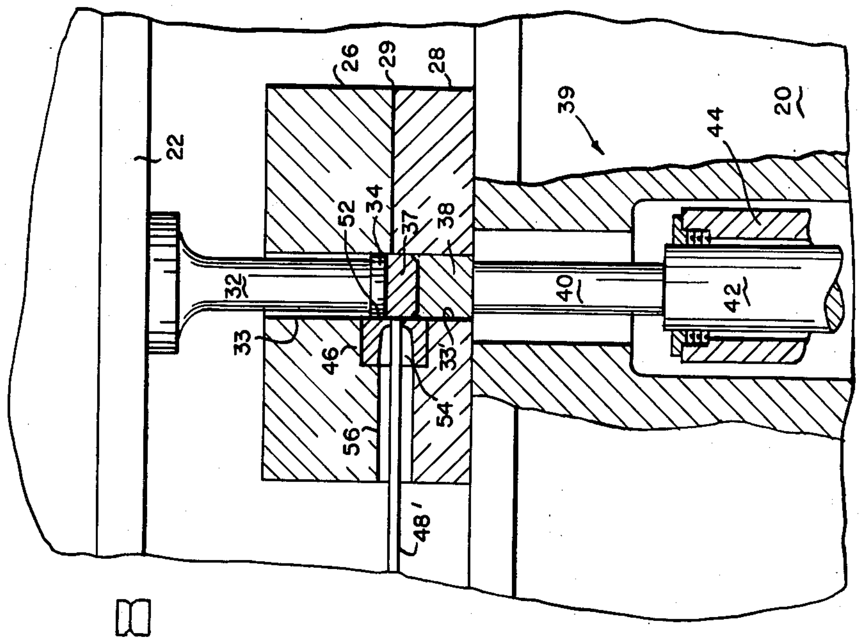
FIG. 8 is a vertical axial sectional view of a portion of the apparatus of FIG. 3 at the end of the operating stroke.

Preferably, the remainder 37 of the billet 36 is first removed and replaced with a new billet 36 that is lowered into the container by means of the ejector 39; then the ram 32 is lowered into contact with the billet 36 as seen in FIG. 7. The ram 32 is then forced downward to the position shown in FIG. 8 thereby to extrude the billet laterally through the die 46 to produce an extruded section 48′, which is cleared through the cutaway portion 54 of the die 46 and through the cutaway portion 56 of the container. The profile of the extruded section 48′ corresponds to the opening in the die shown in FIG. 6 having the wide thin slot 48 with the T shaped slots 50 extending at right angles thereto. It will be understood that any other type of profile could be employed, if desired.

In the present practice of extrusion work, the die is arranged so that metal flow proceeds in the direction of movement of the ram of the press. While flowing the metal perpendicular to the direction of the ram of the press as herein shown in FIGS. 3 and 4 requires a slightly higher pressure, this pressure increase is justified since it provides a way to use existing forging presses having a high capacity such as 18,000 tons, for example, for the manufacture of thin, wide extrusions that cannot possibly be successfully made on existing extrusion presses. Moreover, it is a specific feature of the present invention to provide a container made in two parts and to place the extrusion die inside the container, half of the die in each container-part where it is made secure with minimum fastening means.

Advantages of the present invention include that it is applicable to containers other than round and it eliminates pressure differences over large widths of extruded sections to thereby execute an extrusion with a minimum total pressure. Another advantage of this invention is that it produces maximum width sections with minimum subsequent straightening. A further advantage of this invention is that large capacity vertical forging presses may be employed for extrusion purposes. A still further advantage of this invention is that very low cost is required for die material in preparation. This invention has still another advantage in requiring minimum effort in changing the extrusion die. The invention also permits the use of built-up extrusion dies.

The application of nonround containers, such as flat or oval, of large size in prior extrusion presses was non-existing since space conditions did not permit the installation of this type of container. New extrusion presses, which are intended to be used for extrusion of wide, thin sections with a minimum of total pressure, have been constructed to have sufficient capacity for extruding thin, wide sections from a nonround billet by providing proper space conditions.

Figure 10:
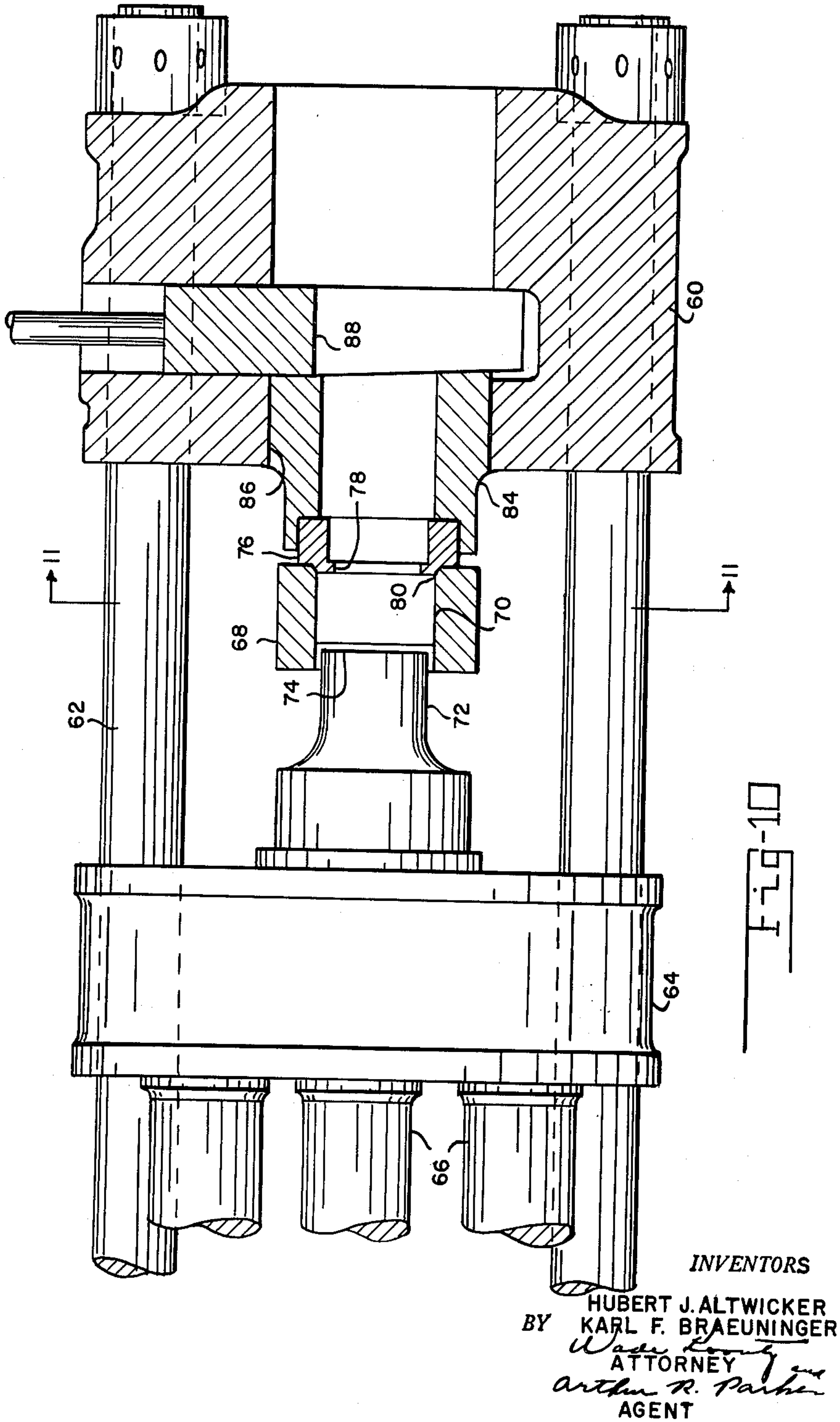
FIG. 10 is a top plan view, partly in section, of another form of the invention showing a horizontal extrusion press having equipment for extruding wide, thin sheets employing a nonround billet container.
Figure 11:
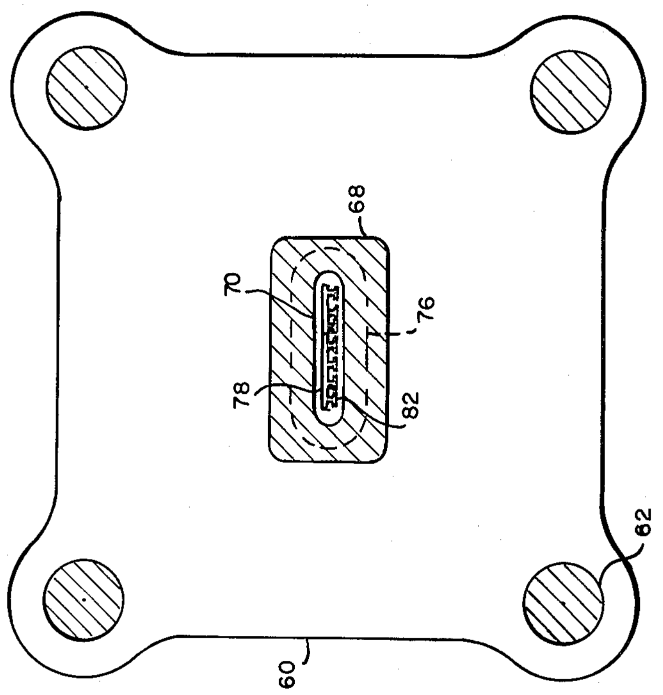
FIG. 11 is a sectional view taken on the line 11—11 of FIG. 10.

A horizontal extrusion press is shown in FIGS. 10 and 11 for extruding thin, wide sheets from nonround billets. While the extrusion press of FIGS. 10 and 11 is limited as to the width of the profiles it may extrude due to its capacity, it will be understood that the same relationship of parts would be employed for a large capacity extrusion press to extrude very wide, thin sheets. As shown in FIGS. 10 and 11, the press comprises a front cross beam 60 having supporting columns 62 extending therethrough. A ram cross beam 64 is horizontally slidable upon the supporting columns 62 by press plungers 66.

A billet container 68, which is shown rectangular on the outside but may be square, circular, or of any other irregular shape if desired, is supported on the press by suitable means (not shown). The container 68 has a passage 70 of nonround shape extending therethrough. The passage 70 (see FIG. 11) is of an elongated substantially rectangular shape in the disclosed example, but any other suitable nonround shape may be used, if desired, depending on the shape of the section to be extruded. A ram 72 fits freely within the passage 70 of the billet container 68. The ram 72 has a dummy block 74 on the front portion thereof to precede the ram through the passage 70 of the container; the dummy block 74 fits the passage 70 closely.

A die 76 is located immediately forward of the container 68 and is held concentric therewith by a shoulder 80. The die 76 has an opening (see FIG. 11) for extruding wide, thin sheets with a plurality of small integral T shaped ribs closely spaced and running lengthwise of the sheet though any other suitable configuration may be employed, if desired. The wide, thin sheets are extruded through an elongated die slot 78 and the integral T shaped ribs are extruded through T slots 82, which extend from the elongated slot 78 at right angles thereto. The die 76 is held by a die holder 84, which is concentrically positioned in a bore 86 of the front cross beam 60. A transversely movable wedge-type lock 88 prevents axial movement of the die holder 84. It will be readily understood that when horizontal extrusion presses, such as shown in FIGS. 10 and 11, are constructed in sizes and pressure capacities capable of making the desired wide extrusions that the vertical forging press will be superseded by the extrusion press.

Figure 12:
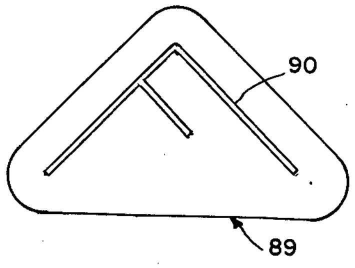
FIG. 12 is a diagrammatic view illustrating a billet and a die member from which is formed an F shaped extruded member.
Figure 13:
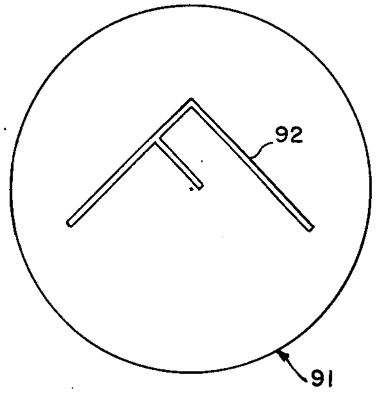
FIG. 13 is a diagrammatic view illustrating the relation of an F shaped die member with respect to a round billet.

While the shape of the die in FIGS. 10 and 11 produces a wide, thin sheet with a plurality of small integral T shaped ribs, it will be understood that other types of wide, thin extruded members could be produced from other nonround billets. For example, FIG. 12 shows a triangular shaped billet 89 from which would be produced an F shaped extruded member; the opening 90 of the die member to form the F shaped extruded member is shown superimposed on the billet 89. FIG. 13 shows an F shaped die member with respect to a round billet 91 from which is formed the F shaped extruded member. As is obvious from a study of FIG. 13, the opening 92 in the die member is a greater distance from the exterior walls of the container inclosing the billet 91 than is the opening 90 of FIG. 12 from the exterior walls of the triangular shaped container. Thus, there is more friction to be overcome from the billet when using a round billet, such as shown in FIG. 13, than using triangular shaped billets, as shown in FIG. 12; this is due to the fact that the metal particles have to go through a greater distance whenever a round container is used. It will be understood that it is desired to reduce the contact area between container and billet and thereby to retain as much of the heat as possible since this makes the metal more fluid and thereby helps to reduce the friction between the billet and the wall of the container; thus, the more fluid the metal is, the easier it is to extrude the member. Furthermore, it will be readily observed that the area of the triangular shaped billet 89 is much less than the area of the round billet 91 so that a much greater total force is required to extrude an F shaped section when using the round billet 91 than when using the triangular shaped billet 89. It will be understood that the container of the extrusion press of FIGS. 10 and 11 will have a passage of the triangular shape of the billet 89 of FIG. 12 when it is desired to produce an F shaped extruded member. It also will be noted that the use of the triangular billet rather than the round billet permits a saving in the cost of the billet since a smaller volume is employed in the triangular shaped billet.

Figure 14:
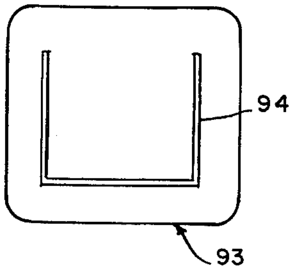
FIG. 14 is a diagrammatic view illustrating a billet and a die member from which is formed a U shaped extruded member.
Figure 15:
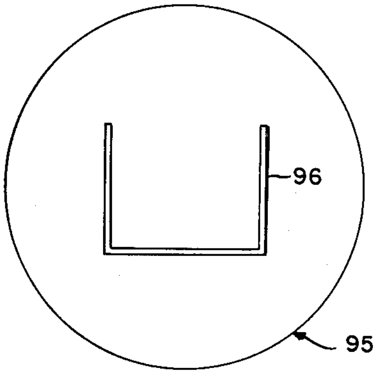
FIG. 15 is a diagrammatic view illustrating the relation of a U shaped die member with respect to a round billet.

If it is desired to form a wide, thin extruded section of U shape rather than the extruded section of FIGS. 10 and 11, a square shaped billet 93 may be employed (see FIG. 14). An opening 94 of the die member, which produces the U shaped extruded section, is shown superimposed on the billet 93 in FIG. 14. The relation of a round billet 95 with respect to a U shaped opening 96 in a die member is shown in FIG. 15. It will be readily observed that the friction and heat transfer problem mentioned with respect to FIGS. 12 and 13 again exists with respect to FIGS. 14 and 15 so that it is easier to extrude the U shaped section from the square shaped billet 93 than from the round billet 95. Likewise, less total pressure is required to extrude the U shaped section from the square shaped billet 93 than from the round billet 95. The square shaped billet 93 also reduces the cost since it employs a smaller volume than the round billet 95.

Thus, it will be observed that the extrusion press of FIGS. 10 and 11 may be employed to produce any type of wide, thin metallic section such as the F shaped section of FIG. 12 or the U shaped section of FIG. 14. The only necessary change is that the shape of the passage in the container be altered to coincide with the shape of the billet being employed. Obviously, any of these nonround billets, whether they be square or oval or triangular or any other irregular shape, requires less total pressure for extrusion than the use of a round billet.

An advantage in using nonround billet shapes in extrusion operations is that the total force of a given press is directed towards obtaining high specific pressures by reducing the force-absorbing area of the container from a conventionally used round shape to a nonround shape of flat, rectangular, square, oval, or other irregular configurations. Another advantage in using nonround billet shapes in extrusion operations is that the products have reduced internal stresses because the actual extrusion procedure is done under flow conditions involving a minimum of friction between the metal to be extruded and the container walls. A further advantage in using nonround billet shapes in extrusion operations is that high concentrated pressures may be exerted upon the metal entering the orifice of the extrusion die to thereby permit the manufacture of very thin wall thicknesses that cannot be obtained from round containers when using the same total force of a given press.

For purposes of exemplification, particular embodiments of the invention have been shown and described according to the best present understanding thereof. However, it will be apparent that changes and modifications in the arrangement and construction of the parts thereof may be resorted to without departing from the true spirit and scope of the invention.

We claim:

1. Extruding apparatus for horizontally extruding metallic sheets from a nonround billet of substantially the same width as the extruded sheet in combination with a high pressure vertical forging press including a container supported on the press, said container having a vertical nonround passage extending therethrough, said passage being of substantially the same width as the sheet to be extruded, said passage having a constant cross-sectional area, said container having a horizontal recess therein communicating with the passage thereof, die means disposed within the recess and supported by the container for extrusion in a horizontal direction, said die means having a nonround opening of substantially the same width as the width of the passage of the container and being shaped in the profile to be extruded, the cutting face of the die means being arranged adjacent the passage of the container, ram means vertically movable through the passage of the container from one end thereof whereby on insertion of a nonround billet in the passage and actuation of the ram means the billet will be extruded through the die means in a horizontal direction with a minimum of pressure to produce sheets having no undue stress or strain, and means movable in the passage of the container from the opposite end in the opposite direction to the movement of the ram means when the billet is extruded to clear said passage.

2. Extruding means for horizontally extruding wide ribbed metallic sheets in combination with a high pressure vertical forging press including a support means fixed relative to the press and having a vertical opening therethrough, a die block element mounted on the support means and having a vertical opening aligned with the opening in the support means, said opening in said die block element being an elongated substantially rectangular cross section, said die block element having a stepped horizontal recess in the upper surface thereof, a second die block element secured to the first die block element and having an aligned matching opening therethrough forming a continuation of the openings in the first die block element and support means, said opening in said second die block element being an elongated substantially rectangular cross section, said second die block element having a matching stepped recess in the bottom surface thereof, an elongated extruding die member mounted in the stepped recesses of the die block elements and supported by the die block elements for extrusion in a horizontal direction, the cutting face of the extruding die member being arranged adjacent the continuous openings through said elements, ram means having an elongated substantially rectangular face aligned with the continuous openings in the die block elements, said ram means being movable through said continuous openings whereby on insertion of an elongated unround billet in the continuous openings and actuation of the ram means the billet will be extruded through the extruding die in a horizontal direction with a minimum of pressure to produce sheets having no undue stress or strain, an ejector bar mounted in the opening in said support means for movement in said continuous openings in said die block elements, means on the billet-engaging face of said ejector bar for shearing said billet remainder on ejection to clear said continuous openings, and means connected to said ejector bar to control said ejector bar.

References Cited in the file of this patent

UNITED STATES PATENTS

| | | |
|---|---|---|
| 421,666 | Carpenter | Feb. 18, 1890 |
| 506,215 | Edison | Oct. 10, 1893 |
| 603,787 | Holinger | May 10, 1898 |
| 629,610 | Robertson | July 25, 1899 |
| 699,308 | Hall | May 6, 1902 |
| 812,228 | Von Philip | Feb. 13, 1906 |
| 1,199,080 | Jones | Sept. 26, 1916 |
| 1,317,238 | Summey | Sept. 30, 1919 |
| 1,682,399 | Mitchell | Aug. 28, 1928 |
| 1,840,472 | Singer | Jan. 12, 1932 |
| 2,172,867 | Dreyer | Sept. 12, 1939 |
| 2,389,876 | Sequin | Nov. 27, 1945 |
| 2,401,235 | Farr et al. | May 28, 1946 |
| 2,512,264 | Brauchler | June 20, 1950 |
| 2,728,453 | Thweatt et al. | Dec. 27, 1955 |

FOREIGN PATENTS

| | | |
|---|---|---|
| 9,442 | Great Britain | 1897 |
| 376,132 | France | May 3, 1907 |
| 515,641 | Great Britain | Dec. 11, 1939 |